United States Patent [19]

Sasaki et al.

[11] Patent Number: 4,461,752

[45] Date of Patent: Jul. 24, 1984

[54] PROCESS FOR THE PRODUCTION OF HYDROGEN CYANIDE

[75] Inventors: Yutaka Sasaki; Hiroshi Utsumi, both of Kanagawa, Japan

[73] Assignee: Nitto Chemical Industry Co., Ltd., Tokyo, Japan

[21] Appl. No.: 468,528

[22] Filed: Feb. 22, 1983

[30] Foreign Application Priority Data

Feb. 22, 1982 [JP] Japan .................................. 57-25895

[51] Int. Cl.$^3$ ............................................... C01C 3/02
[52] U.S. Cl. .................................................... 423/376
[58] Field of Search ........................................ 423/376

[56] References Cited

U.S. PATENT DOCUMENTS

| 2,006,981 | 7/1935 | Andrussow | 423/376 |
| 2,746,843 | 5/1956 | Bellringer | 423/376 |
| 3,911,089 | 10/1975 | Shiraishi et al. | 423/376 |

FOREIGN PATENT DOCUMENTS

51-10200  1/1976  Japan .................................. 423/376

OTHER PUBLICATIONS

Chemical Abstracts 85 (24), 179777p.

*Primary Examiner*—John Doll
*Assistant Examiner*—Wayne A. Langel
*Attorney, Agent, or Firm*—Sughrue, Mion, Zinn, Macpeak, and Seas

[57] ABSTRACT

An improved catalyst for use in the production of hydrogen cyanide by vapor phase catalytic ammoxidation of methanol, and a process for the production of hydrogen cyanide in the presence of said improved catalyst are disclosed. This improved catalyst is represented by the following empirical formula:

$$Fe_aCu_bSb_cMo_dMe_eTe_fQ_gO_h(SiO_2)_i$$

wherein Me is at least one element selected from the group consisting of V and W; Q is at least one element selected from the group consisting of Mg, Zn, La, Ce, Al, Cr, Mn, Co, Ni, Bi, U and Sn; and a, b, c, d, e, f, g, h and i each represents the atomic ratio of the elements in the formula for which they are subscripts, wherein for a=10, b=0.5 to 5, c=12 to 30, d=0 to 15, e=0 to 3, f=0 to 5, g=0 to 6, h=number of oxygen atoms as determined corresponding to the oxide formed by combining the above-described elements, and i=25 to 200.

14 Claims, No Drawings

PROCESS FOR THE PRODUCTION OF HYDROGEN CYANIDE

FIELD OF THE INVENTION

The present invention relates to a process for the production of hydrogen cyanide by vapor phase catalytic ammoxidation of methanol.

BACKGROUND OF THE INVENTION

Hydrogen cyanide has been produced by decomposition of formaldehyde, ammoxidation of methane, and so forth. In recent years, the major portion of hydrogen cyanide commercially used has been supplied as a by-product obtained in the production of acrylonitrile by ammoxidation of propylene. However, with substantial improvements of catalysts for the production of acrylonitrile by ammoxidation of propylene, the amount of hydrogen cyanide by-produced has been decreased, and it has sometimes become difficult to ensure the supply of an adequate amount of hydrogen cyanide for the production of methacrylate by an acetone cyanhydrin process.

Transportation of hydrogen cyanide is difficult and dangerous because of its toxicity. It is, therefore, recommendable that hydrogen cyanide is used in a process where it is consumed immediately after it is produced.

The present invention is intended to provide a process which can be advantageously employed, for example, in those cases that:

(1) The change of catalyst and so forth in the existing equipment of production of acrylonitrile makes it difficult to ensure the amount of hydrogen cyanide to be supplied to the attached acetone cyanhydrin equipment;

(2) The equipment of production of methacrylate is planned to construct independently from the acrylonitrile production equipment; and (3) It is planned to produce hydrogen cyanide which is to be fed to equipments of production of various hydrogen cyanide derivatives.

In recent years, the use of methanol as a fuel has been studied. When methanol is available more inexpensively, the process of the invention is particularly advantageous.

Hydrogen cyanide produced by the process of the invention contains reduced amounts of by-products and impurities compared with the one produced by ammoxidation of hydrocarbons such as propylene, isobutene, toluene, and xylene. In some case, therefore, it can be used as such without any special purification. In accordance with the process of the invention, in addition to hydrogen cyanide as a main product, only small amounts of carbon monoxide and carbon dioxide gas are produced.

The process of the invention has advantages over the conventionally widely used process of ammoxidation of methane in that the conversion of the feed is high, the catalyst is inexpensive, the reaction temperature is low, the disposal of waste gas is easy because nitrogen oxides are not almost produced, and in that the construction cost can be saved.

Various techniques are known for the production of hydrogen cyanide from methanol, including a method wherein a vanadium/tin oxide catalyst is used (Russian Pat. No. 106,226) a method wherein a tin/antimony oxide catalyst is used (British Pat. No. 913,836), a method in which a molybdenum oxide catalyst is used (British Pat. No. 718,112 and U.S. Pat. No. 2,746,843), a method in which a catalyst comprising molybdenum oxide and other various elements is used (U.S. Pat. No. 3,911,089), and a method in which an oxide catalyst comprising antimony, and iron, cobalt, nickel, manganese, zinc, uranium, or the like is used (Japanese Patent Publication No. 39839/79).

These methods, however, suffer from various disadvantages in the industrial practice thereof. For example, in the case of catalysts containing large amounts of vanadium, molybdenum, and the like, (1) since the simple combustion of ammonia occurs, decreasing the unit of ammonia, it is inevitably necessary to introduce steam for the prevention of combustion of ammonia, and (2) since the sublimation of the molybdenum component occurs during use, decreasing not only the activity of the catalyst, but also its strength, it is difficult to use the catalyst over a long period of time. On the other hand, catalysts composed mainly of antimony are preferred in that they cause almost no combustion of ammonia, and the reduction in activity and strength of the catalyst due to the dissipation of antimony does not occur. These catalysts, however, have disadvantages in that they are subject to changes with a lapse of time during use, and their strength is insufficient depending on the composition thereof.

SUMMARY OF THE INVENTION

The present invention overcomes the disadvantages of catalysts composed mainly of antimony, and relates to improvements in the method described in Japanese Patent Publication No. 39839/79.

The present invention relates to a process for the production of hydrogen cyanide by vapor phase catalytic ammoxidation of methanol, characterized by using a catalyst represented by the formula:

$$Fe_aCu_bSb_cMo_dMe_eTe_fQ_gO_h(SiO_2)_i$$

wherein

Me is at least one element selected from the group consisting of V and W;

Q is at least one element selected from the group consisting of Mg, Zn, La, Ce, Al, Cr, Mn, Co, Ni, Bi, U, and Sn; and a, b, c, d, e, f, g, h and i each represents the atomic ratio of the elements in the formula for which they are subscripts, wherein for $a=10$, $b=0.5$ to 5, preferably 0.8 to 4.5, more preferably 1 to 4, $c=12$ to 30, preferably 15 to 30, more preferably 17 to 26, $d=0$ to 15, preferably 0.1 to 10, more preferably 0.3 to 5, $e=0$ to 3, preferably 0.05 to 2, more preferably 0.1 to 1, $f=0$ to 5, preferably 0.1 to 4, more preferably 0.5 to 3, $g=0$ to 6, preferably 0 to 5, more preferably 0.1 to 3, $h=$ the number of oxygen atoms corresponding to the oxides formed by combining the above-described elements, and $i=25$ to 200.

DETAILED DESCRIPTION OF THE INVENTION

As demonstrated in the examples as described hereinafter, the addition of copper as an essential component to oxide catalysts comprising antimony and iron improves their activity and physical properties.

Oxide catalysts comprising antimony and copper alone accelerate the combustion of methanol, producing almost no hydrogen cyanide. Unexpectedly, on the other hand, it has been found that oxide catalysts comprising specific proportions of antimony, iron, and copper are entirely free from the above-described problems resulting from the use of the copper component, and contrarily produce hydrogen cyanide in high yields. Furthermore, the addition of copper prevents the precipitation of projected materials on the surface of the catalyst which is easy to be caused in the case of a high antimony content, and its addition is effective for increasing the strength of catalyst.

Catalysts as used herein are composed mainly of antimony, iron, and copper. The addition of at least one element selected from the group consisting of molybdenum, vanadium, and tungsten is useful in that it increases the resistance against deterioration due to reduction of the resulting catalysts. Since the reaction rate of methanol is great compared with those of the usual olefins, for example, propylene, if an error is made in the reaction operation, there is a great danger of catalyst's being subject to reduction deterioration. Accordingly, it is preferable to add one or more of these elements.

Addition of tellurium has the effect of increasing the selectivity of hydrogen cyanide.

In addition, as optional components, magnesium, zinc, lanthanum, cerium, aluminum, chromium, manganese, cobalt, nickel, bismuth, uranium, tin, etc., can be added. Addition of these elements makes it possible to control the reaction rate, the physical properties of the catalyst, and so forth.

The silica component is desirably used to provide catalysts with the necessary strength. Particularly, in the case of catalysts for use in a fluidized bed, the addition of the silica component is essential for providing preferred physical properties (particle density and strength).

As starting materials for the production of catalysts of the invention, various compounds containing each component, such as oxides, hydroxides, chlorides and nitrates, can be used.

As starting materials for the antimony component, for example, antimony trioxide, antimony tetraoxide, and antimony pentaoxide can be used. In addition, compounds produced by nitration of metallic antimony with nitric acid may be used.

Compounds which can be used as starting materials for the iron and copper components include oxides, hydroxides, nitrates, and chlorides of iron or copper. It is preferable to use their nitrates, and solutions of the electrolytic iron and electrolytic copper dissolved in nitric acid.

Water-soluble or water-insoluble molybdenum compounds can be used as starting materials for the molybdenum component. Examples include molybdenum trioxide, molybdic acid, ammonium paramolybdate, ammonium metamolybdate, and molybdenum halides.

In connection with the vanadium and tungsten components, water-soluble or water-insoluble compounds can be used as described for the molybdenum component.

For the tellurium component, water-soluble or water-insoluble tellurium compounds can be used. Examples include tellurium dioxide, tellurous acid, and telluric acid. In addition, a solution of metallic tellurium dissolved in nitric acid or hydrogen peroxide may be used.

As starting materials for the other components, their nitrates can be used. In addition, chlorides and oxides, for example, can be used.

As a silica material, it is preferred to use silica sol.

Catalysts as used herein can be prepared by techniques well known in the art, such as a mixing method, a precipitating method, and an impregnating method. For example, in the case of catalysts for use in a fluidized bed, the necessary starting materials selected from above-described starting materials for the catalyst components are mixed, and if necessary, are subjected to pH adjustment, heat-treatment, etc. Thereafter, the resulting slurry is spray-dried to form finely divided particles, and the thus-formed particles are calcined at a temperature of from 200° to 600° C. and finally at a temperature of from 500° to 950° C. for from 0.5 to 50 hours to prepare the desired catalyst. Particle sizes of these catalysts are preferably within the range of from 5 to 300 microns, with the range of from 10 to 200 microns being more preferred.

The methanol feed as used herein may be pure methanol or crude methanol containing certain impurities.

Industrial ammonia can be used as the ammonia feed.

As the oxygen source, air is preferably used from an economic standpoint. This air may be diluted with inert gas, such as nitrogen, and steam, or contrarily enriched with oxygen. The addition of steam tends to prevent the formation of carbon monoxide or carbon dioxide, and in some cases, therefore, provides preferred results. The feed gas may be diluted with reaction off-gas (a mixed gas comprising nitrogen, carbon dioxide, carbon monoxide, etc.).

In carrying out the process of the invention by a fluidized bed process, when methanol, ammonia, and at least one gas selected from the group consisting of nitrogen, steam, carbon dioxide, carbon monoxide, helium, argon, and air are introduced into a methanol-ammonia sparger and the gas linear velocity at which the gas feed is discharged from the sparger nozzle is increased, there can be obtained the effects that the yield of the desired product, hydrogen cyanide, is increased and changes of the yield of hydrogen cyanide with a lapse of time are reduced.

The concentration of methanol in the feed gas may be changed within the range of from 1 to 20% by volume, preferably 3 to 10%.

The molar ratio of oxygen to methanol in the feed gas is from 0.5:1 to 15:1 and preferably from 1:1 to 10:1. The molar ratio of ammonia to methanol in the feed gas is from 0.5:1 to 3:1 and preferably from 0.7:1 to 2.5:1.

It is preferred that the reaction temperature is from 350° to 500° C., preferably 380° to 480° C., the contact time is from 0.5 to 20 seconds, and the reaction pressure is from atmospheric pressure to about 2 kg/cm$^2$G.

The vapor phase catalytic ammoxidation of the invention can be carried out by any of a fixed bed process and a fluidized bed process. The effects of the catalyst of the invention are exhibited particularly greatly when the catalyst is used in a fluidized bed process, and its changes in activity with a lapse of time are small compared with when it is used in a fixed bed process.

As one embodiment of the fluidized bed process, there can be employed a process in which all the feed gases are introduced into the fluidized bed from the lower portion thereof. In general, however, this process is limited to a small-sized plant. As the size of the plant is increased, the removal of heat becomes more difficult. For this reason, it is necessary to make some modifications to the plant and the procedure of operation.

It is thus preferred that a sparger for oxygen or an oxygen-containing gas and a sparger for methanol and ammonia, or a methanol/ammonia-containing gas are installed separately, the former sparger being provided at a location below the latter sparger and spaced apart a certain distance. It has been found that the installation of the two spargers makes it easy to arrange the heat-removing coils and other internal devices, ensures stable operation, and further, decreases changes in catalytic activity with time.

When the distance between the oxygen or oxygen-containing gas sparger and the methanol/ammonia or methanol/ammonia-containing gas sparger is represented by l (meter) and the diameter of reaction zone of the reactor is represented by m (meter), it is preferred that l/m is 0.1:1 to 10.0:1, more preferably 0.15:1 to 8.5:1. This is applicable particularly to cases in which the diameter of the reaction zone, m, is at least 0.1 meter. When l/m is too large, the necessary amount of the catalyst and the loss of the catalyst increase undesirably. Thus, it is preferred that l/m is less than about 10:1.

The present invention will hereinafter be described in greater detail by reference to the following Examples and Comparative Examples.

Yield of Hydrogen Cyanide (%) =

$$\frac{\text{Weight Amount of Carbon in Hydrogen Cyanide Formed}}{\text{Weight Amount of Carbon in Methanol Supplied}} \times 100$$

Unreacted Methanol (%) =

$$\frac{\text{Amount of Residual Methanol (moles)}}{\text{Amount of Methanol Supplied (moles)}} \times 100$$

Catalytic Activity Testing Method

There is used a fluidized bed reactor in which the inner diameter of a catalyst fluidized zone is 5 cm. The feed gas is fed to the reactor in such a manner that the apparent flow rate of gas is 15 cm/sec under the reaction conditions:

The apparent contact time is defined as follows:

Apparent Contact Time (sec) =

$$\frac{\text{Volume of Catalyst Based on Apparent Bulk Density (liter)}}{\text{Flow Rate of Gas Feed Calculated under Reaction Conditions (liter/sec)}}$$

The molar ratios of the feed gas in the reaction are as follows:

Oxygen/Methanol = 2.0:1 (molar ratio)

Ammonia/Methanol = 1.1:1 (molar ratio)

The feed gas consists of methanol, ammonia, oxygen, and nitrogen, and the proportion of methanol in the feed gas is 4.5% by volume.

Preparation of Catalysts and Results Thereof

EXAMPLE 1

A fluidized bed catalyst represented by the empirical formula: $Fe_{10}Cu_3Sb_{22}O_{62}(SiO_2)_{60}$ was prepared as follows:

(I) 1.749 kg of antimony trioxide powder (II) 0.305 kg of electrolytic iron powder was gradually added to and dissolved in a mixture of 3 l of nitric acid (specific gravity: 1.38) and 2.5 l of water which had been heated. Then, 0.484 g of copper nitrate was added to the above-prepared solution and dissolved therein.

(III) 9.83 kg of silica sol (silica content: 20% by weight)

Component (III) was added to Component (II) while maintaining stirring, and Component (I) was then added thereto.

The resulting mixture was adjusted to pH 2 by adding small portions of 15% aqueous ammonia. The thus-formed slurry was heated at 100° C. for 8 hours while maintaining stirring.

The slurry was then spray-dried in the usual manner by the use of a rotary disc type spray-drying apparatus.

The thus-prepared fine spherical particles were calcined at 250° C. for 8 hours and then, at 400° C. for 5 hours, and finally calcined at 800° C. for 5 hours in a fluidized bed calcination furnace.

EXAMPLE 2

A fluidized bed catalyst represented by the empirical formula: $Fe_{10}Cu_1Sb_{15}O_{46}(SiO_2)_{60}$ was prepared in the same manner as in Example 1 except that the final catalyst calcination was performed at 880° C. for 8 hours.

EXAMPLE 3

A fluidized bed catalyst represented by the empirical formula: $Fe_{10}Cu_3Sb_{28}O_{74}(SiO_2)_{60}$ was prepared in the same manner as in Example 1 except that the final catalyst calcination was performed at 850° C. for 4 hours.

EXAMPLE 4

A fluidized bed catalyst represented by the empirical formula: $Fe_{10}Cu_3Sb_{22}Mo_{0.7}W_{0.3}Te_{1.5}O_{68}(SiO_2)_{60}$ was prepared in the same manner as in Example 1 except that ammonium paramolybdate was used as an Mo component starting material, ammonium paratungstate as a W component starting material, and tellurium dioxide as a Te component starting material, and that the final catalyst calcination was performed at 770° C. for 5 hours.

EXAMPLE 5

A fluidized bed catalyst represented by the empirical formula: $Fe_{10}Cu_4Sb_{25}Mo_1Te_2O_{76}(SiO_2)_{70}$ was prepared in the same manner as in Example 1 except that ammonium paramolybdate was used as an Mo component starting material, and telluric acid as a Te component starting material, and that the final catalyst calcination was performed at 730° C. for 4 hours.

EXAMPLE 6

A fluidized bed catalyst represented by the empirical formula: $Fe_{10}Cu_1Sb_{22}Mo_{0.7}Te_{1.5}Mg_1O_{66.1}(SiO_2)_{60}$ was prepared in the same manner as in Example 5 except that magnesium nitrate was used as an Mg component starting material, and the final catalyst calcination was performed at 780° C. for 4 hours.

EXAMPLE 7

A fluidized bed catalyst represented by the empirical formula: $Fe_{10}Cu_1Sb_{22}Mo_{0.7}Te_{1.5}Zn_1O_{66.1}(SiO_2)_{60}$ was prepared in the same manner as in Example 5 except that zinc nitrate was used as a Zn component starting material, and the final catalyst calcination was performed at 770° C. for 4 hours.

EXAMPLE 8

A fluidized bed catalyst represented by the empirical formula: $Fe_{10}Cu_3Sb_{22}Mo_{0.7}V_{0.2}La_{0.5}Ce_{0.5}O_{66.35}(SiO_2)_{30}$ was prepared in the same manner as in Example 5 except that ammonia metavanadate was used as a V component starting material, lanthanum nitrate as an La component starting material, and ammonium cerium nitrate as a Ce component starting material, and that the final catalyst calcination was performed at 760° C. for 4 horus.

EXAMPLE 9

A fluidized bed catalyst represented by the empirical formula: $Fe_{10}Cu_2Sb_{22}Mo_{0.5}V_{0.2}Te_{1.5}Al_1O_{67.5}(SiO_2)_{30}$ was prepared in the same manner as in Example 5 except that ammonium metavanadate was used as a V component starting material, and aluminum nitrate as an Al component starting material, and that the final catalyst calcination was performed at 760° C. for 4 hours.

EXAMPLE 10

A fluidized bed catalyst represented by the empirical formula: $Fe_{10}Cu_2Sb_{22}Mo_{0.5}Te_{1.2}Co_{0.5}Ni_{0.5}O_{65.9}(SiO_2)_{60}$ was prepared in the same manner as in Example 5 except that cobalt nitrate was used as a Co component starting material, and nickel nitrate as an Ni component starting material, and that the final catalyst calcination was performed at 780° C. for 4 hours.

EXAMPLE 11

A fluidized bed catalyst represented by the empirical formula: $Fe_{10}Cu_2Sb_{22}Mo_{0.5}Te_{1.2}Bi_{0.5}O_{65.65}(SiO_2)_{60}$ was prepared in the same manner as in Example 5 except that bismuth nitrate was used as a Bi component starting material, and the final catalyst calcination was performed at 770° C. for 4 hours.

EXAMPLE 12

A fluidized bed catalyst represented by the empirical formula: $Fe_{10}Cu_2Sb_{22}Mo_{0.5}Te_{1.2}U_{0.5}O_{66.23}(SiO_2)_{60}$ was prepared in the same manner as in Example 5 except that uranyl nitrate was used as a U component starting material, and the final catalyst calcination was performed at 790° C. for 4 hours.

EXAMPLE 13

A fluidized bed catalyst represented by the empirical formula: $Fe_{10}Cu_2Sb_{22}Mo_{0.5}Te_{1.2}Sn_1O_{66.9}(SiO_2)_{60}$ was prepared in the same manner as in Example 5 except that tin dioxide powder was used as an Sn component starting material, and the final catalyst calcination was performed at 790° C. for 4 hours.

EXAMPLE 14

A fluidized bed catalyst represented by the empirical formula: $Fe_{10}Cu_1Sb_{22}Mo_6Te_{1.5}O_{75}(SiO_2)_{60}$ was prepared in the same manner as in Example 1 except that ammonium paramolybdate was used as an Mo component starting material, and tellurium dioxide as a Te component starting material, and that the final catalyst calcination was performed at 680° C. for 5 hours.

COMPARATIVE EXAMPLE 1

A fluidized bed catalyst represented by the empirical formula: $Fe_{10}Sb_{15}O_{45}(SiO_2)_{60}$ was prepared in the same manner as in Example 1 except that copper nitrate was not added, and the final catalyst calcination was performed at 880° C. for 8 hours.

COMPARATIVE EXAMPLE 2

A fluidized bed catalyst represented by the empirical formula: $Fe_{10}Cu_7Sb_{22}O_{66}(SiO_2)_{60}$ was prepared in the same manner as in Example 1 except that the final catalyst calcination was performed at 880° C. for 5 hours.

COMPARATIVE EXAMPLE 3

A fluidized bed catalyst represented by the empirical formula: $Fe_{10}Cu_3Sb_{22}O_{62}$ was prepared in the same manner as in Example 1 except that silica sol was not added, and the final catalyst calcination was performed at 880° C. for 5 hours. This catalyst, however, powdered during calcination because of its poor strength, and could not be used for the activity testing.

COMPARATIVE EXAMPLE 4

A fluidized bed catalyst represented by the empirical formula: $Cu_{10}Sb_{20}O_{50}(SiO_2)_{60}$ was prepared in the same manner as in Example 1 except that the final calcination was performed at 880° C. for 5 hours.

COMPARATIVE EXAMPLE 5

A fluidized bed catalyst represented by the empirical formula: $Sn_{10}Cu_3Sb_{22}Mo_{0.7}W_{0.3}Te_{1.5}O_{73}(SiO_2)_{60}$ was prepared in the same manner as in Example 1 except that the final calcination was performed at 770° C. for 5 hours.

COMPARATIVE EXAMPLE 6

A fluidized bed catalyst represented by the empirical formula: $Fe_{10}Sb_{22}Mo_{0.7}W_{0.3}Te_{1.5}O_{65}(SiO_2)_{60}$ was prepared in the same manner as in Example 4 except that the Cu component starting material was not added. The final calcination was performed at 770° C. for 5 hours as in Example 4.

COMPARATIVE EXAMPLE 7

A fluidized bed catalyst represented by the empirical formula: $Fe_{10}Sb_{22}Mo_{0.7}Te_{1.5}Zn_1O_{65.1}(SiO_2)_{60}$ was prepared in the same manner as in Example 7 except that the Cu component starting material was not added. The final calcination was performed at 770° C. for 4 hours as in Example 7.

The catalysts prepared in Examples 1 to 14 and Comparative Examples 1 to 7 were subjected to the activity testing, and the results are shown in Table 1.

TABLE 1

| Example No. | Catalyst Composition (atomic ratio) | | | | | | | Si | Reaction Temperature (°C.) | Contact Time (sec) | Yield of Hydrogen Cyanide (%) | Unreacted Methanol (%) |
|---|---|---|---|---|---|---|---|---|---|---|---|---|
| | Fe | Cu | Sb | Mo | Me | Te | Q | | | | | |
| Example 1 | 10 | 3 | 22 | — | — | — | — | 60 | 440 | 2.0 | 88 | 2 |
| Example 2 | 10 | 1 | 15 | — | — | — | — | 60 | 440 | 2.0 | 86 | 0 |
| Example 3 | 10 | 3 | 28 | — | — | — | — | 60 | 440 | 2.0 | 85 | 4 |
| Example 4 | 10 | 3 | 22 | 0.7 | W 0.3 | 1.5 | — | 60 | 430 | 2.5 | 90 | 0 |
| Example 5 | 10 | 4 | 25 | 1 | — | 2 | — | 60 | 430 | 3.0 | 89 | 1 |
| Example 6 | 10 | 1 | 22 | 0.7 | — | 1.5 | Mg 1 | 70 | 430 | 3.0 | 91 | 1 |
| Example 7 | 10 | 1 | 22 | 0.7 | — | 1.5 | Zn 1 | 60 | 430 | 3.0 | 92 | 0 |
| Example 8 | 10 | 3 | 22 | 0.7 | V 0.2 | — | La 0.5 Ce 0.5 | 30 | 430 | 3.0 | 87 | 0 |
| Example 9 | 10 | 2 | 22 | 0.5 | V 0.2 | 1.5 | Al 1 | 30 | 420 | 2.5 | 89 | 0 |
| Example 10 | 10 | 2 | 22 | 0.5 | — | 1.2 | Co 0.5 Ni 0.5 | 60 | 420 | 3.0 | 93 | 0 |
| Example 11 | 10 | 2 | 22 | 0.5 | — | 1.2 | Bi 0.5 | 60 | 420 | 3.0 | 91 | 0 |
| Example 12 | 10 | 2 | 22 | 0.5 | — | 1.2 | U 0.5 | 60 | 410 | 3.0 | 90 | 0 |
| Example 13 | 10 | 2 | 22 | 0.5 | — | 1.2 | Sn 1 | 60 | 410 | 3.0 | 89 | 0 |
| Example 14 | 10 | 1 | 22 | 6 | — | 1.5 | — | 60 | 410 | 1.0 | 82 | 0 |
| Comparative Example 1 | 10 | 0 | 15 | — | — | — | — | 60 | 440 | 2.0 | 79 | 0 |
| Comparative Example 2 | 10 | 7 | 22 | — | — | — | — | 60 | 440 | 2.0 | 81 | 0 |
| Comparative Example 3 | 10 | 3 | 22 | — | — | — | — | 0 | The activity test cannot be performed. | | | |
| Comparative Example 4 | 0 | 10 | 20 | — | — | — | — | 60 | 420 | 2.0 | combustion of both methanol and ammonia | |
| Comparative Example 5 | Sn 10 | 3 | 22 | 0.7 | W 0.3 | 1.5 | — | 60 | 430 | 2.5 | 71 | 2 |
| Comparative Example 6 | 10 | — | 22 | 0.7 | W 0.3 | 1.5 | — | 60 | 430 | 4.0 | 76 | 3 |
| Comparative Example 7 | 10 | — | 22 | 0.7 | — | 1.5 | Zn 1 | 60 | 430 | 4.0 | 78 | 2 |

EXAMPLE 15

The catalyst prepared in Example 4 was placed in a fluidized bed reactor in which the diameter of the reaction zone was 8 inches (20 cm). In the interior of the reactor, a heat-removing coil was placed, and the reactor was provided at the lower portion thereof with an air sparger and a methanol/ammonia sparger, said methanol/ammonia sparger being located above the air sparger. The distance between the air sparger and the methanol/ammonia sparger was set at 1.2 meter, i.e., l/m=6.0.

Air was introduced into the reactor through the air sparger, and methanol, ammonia, and nitrogen through the methanol/ammonia sparger so that the apparent flow rate of gas in the reaction zone was 20 cm/sec.

Molar ratio of oxygen to methanol=2.5:1
Molar ratio of ammonia to methanol=1.3:1

The proportion of methanol in the feed gas consisting of methanol, ammonia, oxygen, and nitrogen was 4.5% by volume.

The contact time as defined herein is as follows:

$$\text{Apparent Contact Time (sec)} = \frac{\text{Volume of Catalyst Based on Apparent Bulk Density of Catalyst Present above Methanol/Ammonia Sparger (liter)}}{\text{Flow Rate of Feed Gas Calculated under Reaction Conditions (liter/sec)}}$$

COMPARATIVE EXAMPLE 8

The procedure of Example 15 was repeated except that the distance between the air sparger and the methanol/ammonia sparger was set at 1 cm, i.e., l/m=0.05.

The results obtained in Example 15 and Comparative Example 8 are shown in Table 2.

TABLE 2

| | Reaction Time (hr) | Reaction Temperature (°C.) | Contact Time (sec) | Yield of Hydrogen Cyanide (%) | Unreacted Methanol (%) |
|---|---|---|---|---|---|
| Example 15 | 2 | 430 | 2.5 | 85 | 2 |
| | 20 | 430 | 2.5 | 83 | 3 |
| Comparative Example 8 | 2 | 430 | 2.5 | 81 | 3 |
| | 20 | 430 | 2.5 | 77 | 5 |

It can be seen from Table 2 that in Comparative Example 8 the yield of hydrogen cyanide is low and changes with time are great compared with Example 15.

Catalyst Strength Testing

With the catalysts prepared in Example 4 and Comparative Examples 5 and 6, the catalyst strength was measured according to the method described in Test Methods for Synthetic Cracking Catalysts, American Cyanamide Co., 6/31-4m-1/57, which was well known as a testing method for fluid catalytic cracking catalysts (FCC catalysts). This test was performed using particles having the particle sizes ranging between 63 and 105 microns.

The results are shown in Table 3. Attrition loss (%), R value, was determined by the following equation:

$$\text{Attrition Loss (\%): } R = \frac{B}{C - A} \times 100$$

wherein

A is loss of catalyst due to attrition for 0 to 5 hours (g),
B is loss of catalyst due to attrition for 5 to 20 hours (g), and
C is amount of catalyst used in testing (g)
In this testing, C is 50.

TABLE 3

|  | Catalyst Composition (atomic ratio) | Final Calcination Conditions | | Attrition Loss R (%) |
|---|---|---|---|---|
|  |  | Temperature (°C.) | Time (hr) |  |
| Catalyst of Example 4 | $Fe_{10}Cu_3Sb_{22}Mo_{0.7}W_{0.3}Te_{1.5}O_{68}(SiO_2)_{60}$ | 770 | 5 | 0.7 |
| Catalyst of Comparative Example 6 | $Fe_{10}Sb_{22}Mo_{0.7}W_{0.3}Te_{1.5}O_{65}(SiO_2)_{60}$ | 770 | 5 | 2.3 |
| Catalyst of Comparative Example 5 | $Sn_{10}Cu_3Sb_{22}Mo_{0.7}W_{0.3}Te_{1.5}O_{73}(SiO_2)_{60}$ | 770 | 5 | 6.8 |

It can be seen from Table 3 that the strength of the catalyst of the invention is great, because its attrition loss (%) is small.

While the invention has been described in detail and with reference to specific embodiments thereof, it will be apparent to one skilled in the art that various changes and modifications can be made therein without departing from the spirit and scope thereof.

What is claimed is:

1. A process for the production of hydrogen cyanide by vapor phase catalytic ammoxidation of methanol at temperatures in the range of 350° C. to 500° C., comprising performing said ammoxidation reaction in the presence of a catalyst represented by the following empirical formula:

$$Fe_aCu_bSb_cMo_dMe_eTe_fQ_gO_h(SiO_2)_i$$

wherein

Me is at least one element selected from the group consisting of V and W;

Q is at least one element selected from the group consisting of Mg, Zn, La, Ce, Al, Cr, Mn, Co, Ni, Bi, U, and Sn; and the symbols a through i each represents an atomic ratio, a = 10,
b = 0.5 to 5,
c = 12 to 30,
d = 0 to 15,
e = 0 to 3,
f = 0 to 5,
g = 0 to 6,
h = the number of oxygen atoms as determined depending on the oxide formed by combining the above-described components, and
i = 25 to 200.

2. A process as claimed in claim 1, wherein the ammoxidation reaction is performed in a fluidized bed reactor.

3. A process as claimed in claim 1, wherein the catalyst is a fluidized bed catalyst, and its particle size ranges between 5 and 300 microns.

4. A process as claimed in claim 1, wherein oxygen or an oxygen-containing gas is introduced through a sparger provided at a lower portion of the reactor, and methanol/ammonia or a methanol/ammonia-containing gas is introduced through a sparger provided at a location above the oxygen or oxygen-containing gas sparger.

5. A process as claimed in claim 4, wherein the ratio of the distance between the oxygen or oxygen-containing gas sparger and the methanol/ammonia or methanol/ammonia-containing gas sparger to the diameter of the reaction zone in the reactor is 0.1:1 to 10.0:1.

6. A process as claimed in claim 1, wherein the gas to be fed through the methanol/ammonia-containing gas sparger contains, in addition to methanol and ammonia, at least one gas selected from the group consisting of nitrogen, steam, carbon dioxide, carbon monoxide, helium, argon, and air.

7. A process as claimed in claim 1, wherein the concentration of methanol in the feed gas is from 1 to 20% by volume, the molar ratio of oxygen to methanol in the feed gas is from 0.5:1 to 15:1, and the molar ratio of ammonia to methanol in the feed gas is from 0.5:1 to 3:1.

8. A process as claimed in claim 1, wherein the reaction is performed at a temperature of from 350° to 500° C., a pressure of from atmospheric pressure to 2 $kg/cm^2G$, and a contact time of from 0.5 to 20 seconds.

9. A process as claimed in claim 3, wherein the catalyst has a particle size within the range of from 10 to 200 microns.

10. A process as claimed in claim 1, wherein the ratio of oxygen to methanol which is fed to the reaction is from 0.5:1 to 15:1.

11. A process as claimed in claim 10, wherein the molar ratio of oxygen to methanol is 1:1 to 10:1.

12. A process as claimed in claim 1, wherein the molar ratio of ammonia to a methanol in gas fed to the reaction is from 0.5:1 to 3:1.

13. A process as claimed in claim 12, wherein the molar ratio of ammonia to a methanol is from 0.7:1 to 2.5:1.

14. A process as claimed in claim 1, wherein the reaction temperature is in the range of 350° C. to 480° C.

* * * * *